(12) United States Patent
Schwarz et al.

(10) Patent No.: US 6,254,145 B1
(45) Date of Patent: Jul. 3, 2001

(54) JOINING AND CONNECTING ELEMENT FOR CORRUGATED PIPES

(75) Inventors: Ernst Schwarz, Volketswil; Ralf Kleeb, Oberdürnten, both of (CH)

(73) Assignee: PMA AG, Uster (CH)

( * ) Notice: Subject to any disclaimer, the term of this patent is extended or adjusted under 35 U.S.C. 154(b) by 0 days.

(21) Appl. No.: 09/367,440

(22) PCT Filed: Feb. 11, 1998

(86) PCT No.: PCT/CH98/00050

§ 371 Date: Aug. 13, 1999

§ 102(e) Date: Aug. 13, 1999

(87) PCT Pub. No.: WO98/40656

PCT Pub. Date: Sep. 17, 1998

(30) Foreign Application Priority Data

Mar. 7, 1997 (CH) .................................... 0546/97

(51) Int. Cl.[7] ...................................... F16L 39/00
(52) U.S. Cl. ............................. 285/319; 285/903
(58) Field of Search ................... 285/319, 903, 285/154.2, 154.1

(56) References Cited

U.S. PATENT DOCUMENTS

| | | | |
|---|---|---|---|
| 3,447,819 | * | 6/1969 | Borsum et al. . |
| 3,532,367 | * | 10/1970 | Roos . |
| 3,731,955 | * | 5/1973 | Borsum et al. . |
| 4,723,796 | * | 2/1988 | Nattel . |
| 4,919,462 | * | 4/1990 | Matsui et al. . |
| 5,112,086 | * | 5/1992 | Gruber et al. ........................ 285/375 |
| 5,813,705 | * | 9/1998 | Dole . |

FOREIGN PATENT DOCUMENTS

2629893 * 10/1989 (FR) .

* cited by examiner

*Primary Examiner*—Teri Pham Luu
(74) *Attorney, Agent, or Firm*—Notaro & Michalos P.C.

(57) ABSTRACT

The connecting component or the connecting fitting (1) comprises at least one locking element which can be shifted-in and shifted-out radially to the longitudinal axis (14) of the fitting (1). The locking element is, for example, connected as a wing (7) via a hinge (22) with the fitting (1) or forms an additional element. On the inside face (10) of the locking element (7) are disposed a multiplicity of locking splice-clips (12) which are resilient. When a pipe end is slid into the fitting (1) with the locking elements (7) closed, these locking splice-clips (12) can be deflected. When load is applied against the insertion direction they become clawed in the pipe jacket. This embodiment permits the shifting-in or dosing of the locking elements (7) in a preassembly step and yet ensures a secure connection. The release of the connection through the radial shifting-out of the locking elements (7) is possible at any time.

7 Claims, 5 Drawing Sheets

JOINING AND CONNECTING ELEMENT FOR CORRUGATED PIPES

FIELD AND BACKGROUND OF THE INVENTION

The invention relates to a joining and connecting component for corrugated pipes with at least one hollow core space encompassed by a casing, with an insertion opening for receiving a pipe end, at least one breach in the jacket of the casing for receiving an additional locking element and at least one locking element, which can be shifted-in or shifted-out radially with respect to the jacket of the casing, with parts which engage the jacket of the corrugated pipe.

Swiss Patent CH 684 293 discloses a connecting component of this type which comprises releasable locking elements for connecting the connecting component with the end of a corrugated pipe. In this connecting component a hollow core space with an insertion opening for receiving a pipe end is provided in the casing of the connecting component. In the jacket of the casing is at least one breach which is intended for receiving the locking element. The locking element in this known disposition is comprised of a radially swiveling pivot wing which is connected at one end via a hinge with the casing of the connecting component. At the other end of the pivot wing a holding element is formed which, when the pivot wing is in the closed position, engages a corresponding holding rib on the casing. On the inside face, directed toward the hollow core space of the casing, of the pivot wing are disposed radially directed, rigid locking cleats, which, when the pivot wing is closed, engage at least one of the corrugation valleys at the end of the corrugated pipe. Connecting this known connecting component with the end of a corrugated pipe takes place such that the corrugated pipe is inserted into the hollow core space and subsequently the pivot wing is swiveled into the breach on the jacket of the casing and closed and the holding elements are latched. In this position of the pivot wing a secure and firm connection is formed between the connecting component and the end of the corrugated pipe. This connection can only be released with an auxiliary tool. When such joining and connecting components are applied in practice the requirement is often made that the joining and connecting components are completely prepared before they are connected with the end of the corrugated pipe and that, after the insertion of the pipe end, no additional steps are necessary. Closure of the pivot wings after they are installed often is difficult or can be overlooked by the assembly personnel.

A further connecting fitting with a locking element detachable from the casing is disclosed in German Patent DE 29 08 337. In the case of this connecting fitting a breach through the jacket is also provided in the casing into which a C-form locking element can be inserted in the radial direction. On this locking element on the inside face, directed toward the hollow core space, of the casing are disposed rigid ribs which, when the locking element is installed, engage the corrugation valleys at the end of the corrugated pipe and block it. At both free ends of the C-form locking element are disposed stop cams which engage locking ribs on the casing of the connecting fitting. This locking element is radially inserted and moved into the locking position only after the pipe end has been inserted into the hollow core space of the connecting fitting. Since the locking element is independent of the casing of the connecting fitting, it can be lost. In the case of an unfavorable position of the connecting fitting, the correct installation of the locking element in the assembly position is also often made difficult. The releasing of the locking connection in this solution also takes place with an auxiliary tool by means of which the locking element is detached from the casing of the connecting fitting and is subsequently moved radially outwardly. The pipe end can subsequently be pulled out without hindrance from the hollow core space of the connecting fitting without the corrugations engaging any part of the locking element. This permits the simple and interference-free separation of the pipe end from the connecting fitting.

SUMMARY OF THE INVENTION

It is the task of the present invention to provide a joining and connecting component or fitting in which the locking element can be moved or swiveled completely out of the jacket in the radial direction and simultaneously the insertion of the pipe end into the connecting component is possible with the locking element shifted-in or closed. A preassembled connecting fitting or connecting component is to be provided in the case of which, after the pipe end has been inserted into the hollow core space of the casing, no additional steps are necessary in order to establish the locking connection.

This task is solved through the characteristics defined in the characterizing clause of the claims. Advantageous further developments of the invention are evident based on the characteristics of the dependent patent claims.

Compared to known fittings, the joining and connecting component according to the invention has the advantages demanded according to the task formulation. The locking splice-clips disposed on the inside face, directed toward the hollow core space of the casing, of the locking element are not oriented radially but rather substantially axially in the direction of the longitudinal axis of the connecting component or of the hollow core space. This makes possible the secure connection of one of the ends of the locking splice-clip with the locking element and the free movability of the other second end region. The entire locking splice-clip or only a partial region can be implemented so as to be resilient. Between the freely movable second end region of the locking splice-clips and a groove face on the inside face of the locking element, a free interspace is implemented which ensures the movability of the free end region. To secure the end of the corrugated pipe inserted into the hollow core space of the casing, on the movable end region of the locking splice-clips lock pawls are formed which in the locked state engage one of the corrugation valleys on the jacket of the corrugated pipe. When sliding the corrugated pipe into the hollow core space of the casing these lock pawls are displaced outwardly which is possible due to the elasticity of the locking splice-clips and the free interspace behind the locking splice-clips. When placing load onto the corrugated pipe against the direction of insertion, i.e. when the pipe and the fitting are mutually loaded under tension, the lock pawls on the locking splice-clips catch in the jacket of the corrugated pipe and become clawed into the corrugation valleys, it is no longer possible to pull the pipe from the fitting since the form of the lock pawls prevent a radial yielding and clawing occurs due to the spring effect. Releasing the lock connection is only possible if the locking element is swiveled or moved radially out of the jacket of the joining or connecting component. This is possible in known manner with the aid of an auxiliary tool and specifically if the locking element is developed as pivot wing, as well as also as C-form supplementary element or in another form which can be radially shifted-out from the casing.

The implementation according to the invention of the joining and connecting fitting permits the closing or the shifting-in of the locking element with the casing before the pipe end is inserted into the hollow core space. This permits the preassembly of the corresponding fittings without additional assembly step and it is no longer necessary to move the locking elements into the locking position after the pipe end is inserted into the fitting. In the case the locking element is implemented as supplementary element the advantage is also obtained that this supplementary element can no longer be lost during transportation, storage and installation of the fitting since it is already installed in or shifted into the fitting and in the locking position is releaseably connected with it. With the implementation according to the invention, consequently, the advantages of the known fittings with radially unshiftable locking elements is retained and additionally the advantage is brought about that preassembly is possible and the pipe end can also be slid into the fitting even with the shifted-in locking element. For disassembling the connection the locking element continues to be simply releasable with an auxiliary tool and the connection between pipe end and fitting can be faultlessly detached without the pipe end or the locking element being damaged. Consequently, a joining and connecting component according to the invention can be reused any number of times since, when separating and assembling pipe and connecting component, no damage to the lock pawls or locking splice-clips on the locking element occurs. In addition to the already known advantages of the known joining and connecting component with radially unshiftable locking elements, the further advantages of handling and simpler assembly are obtained.

BRIEF DESCRIPTION OF THE DRAWINGS

In the following the invention will be explained in further detail in conjunction with embodiment examples with reference to the enclosed drawings. Therein depict.

DESCRIPTION OF THE PREFERRED EMBODIMENTS

Figure 1:
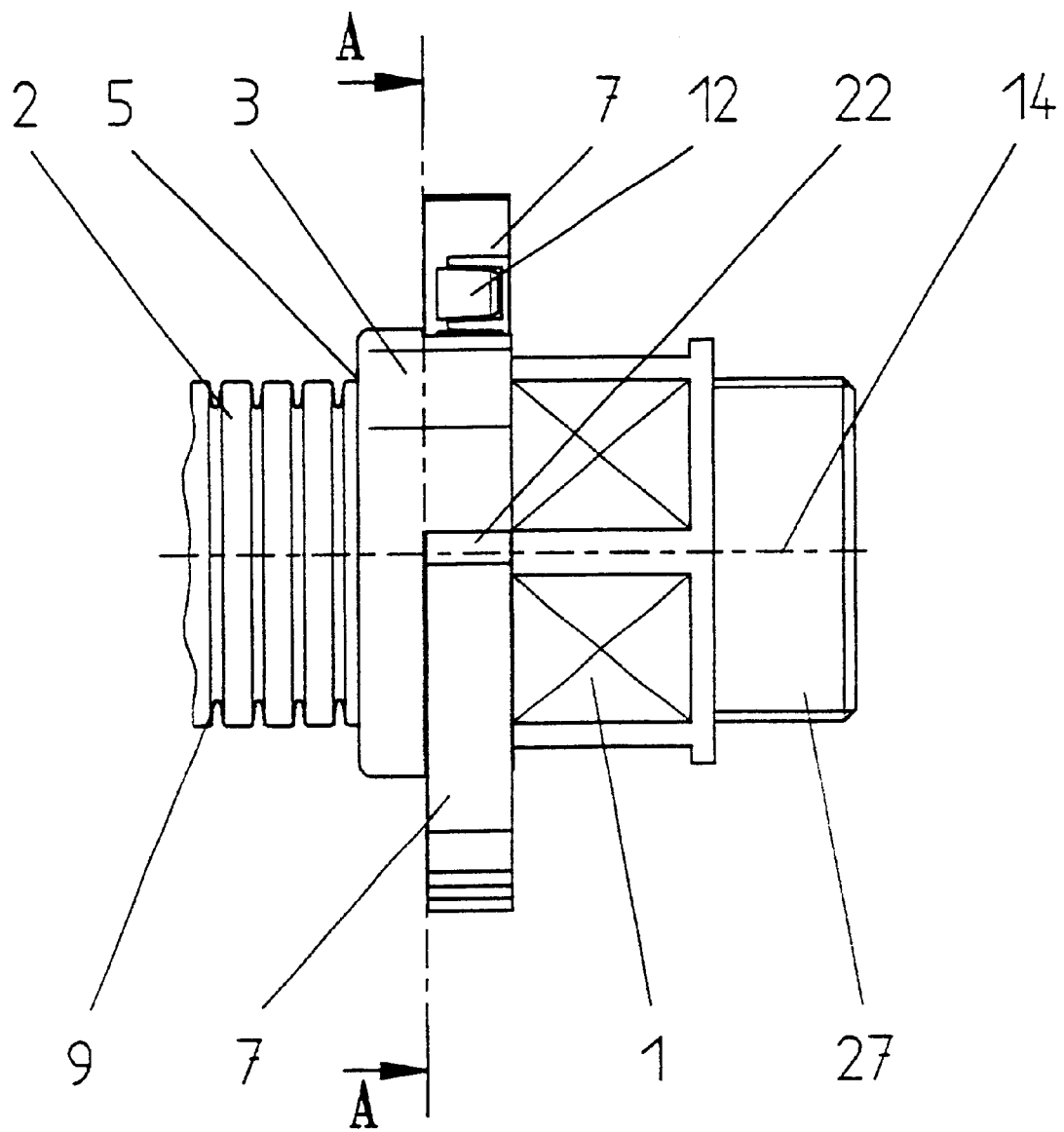
FIG. 1 a side view of a connecting component with two unfolded locking elements in the form of pivot wings, FIG. 2 a cross section through the connecting component according to FIG. 1 in the region of the pivot wings, FIG. 3 a longitudinal section through the connecting component according to FIG. 1 with shifted-in locking element, FIG. 4 a cross section through the locking element in the region of a locking splice-clip, FIG. 5 a C-form locking element with a partial segment of a casing, and FIG. 6 a cross section through the locking element according to FIG. 5 in the region of a locking splice-clip.

The joining and connecting component 1 shown in FIG. 1 comprises a casing 3 and a threaded pipe 27. In the casing 3 is disposed a hollow core space 4 which extends in the direction of the longitudinal axis 14. This hollow core space 4 serves for receiving the end of a corrugated pipe 2 which is connected in this region with casing 3. On casing 3 are articulated two locking elements each in the form of a pivot wing 7 and specifically via a hinge 22. The free end of each pivot wing 7 in the closed state engages a locking region 26 (see FIG. 2) on casing 3 and is latched via a locking hook 25. The implementation of casing 3 and of the pivot wing 7 is evident in known manner in CH 684 293.

Figure 2:
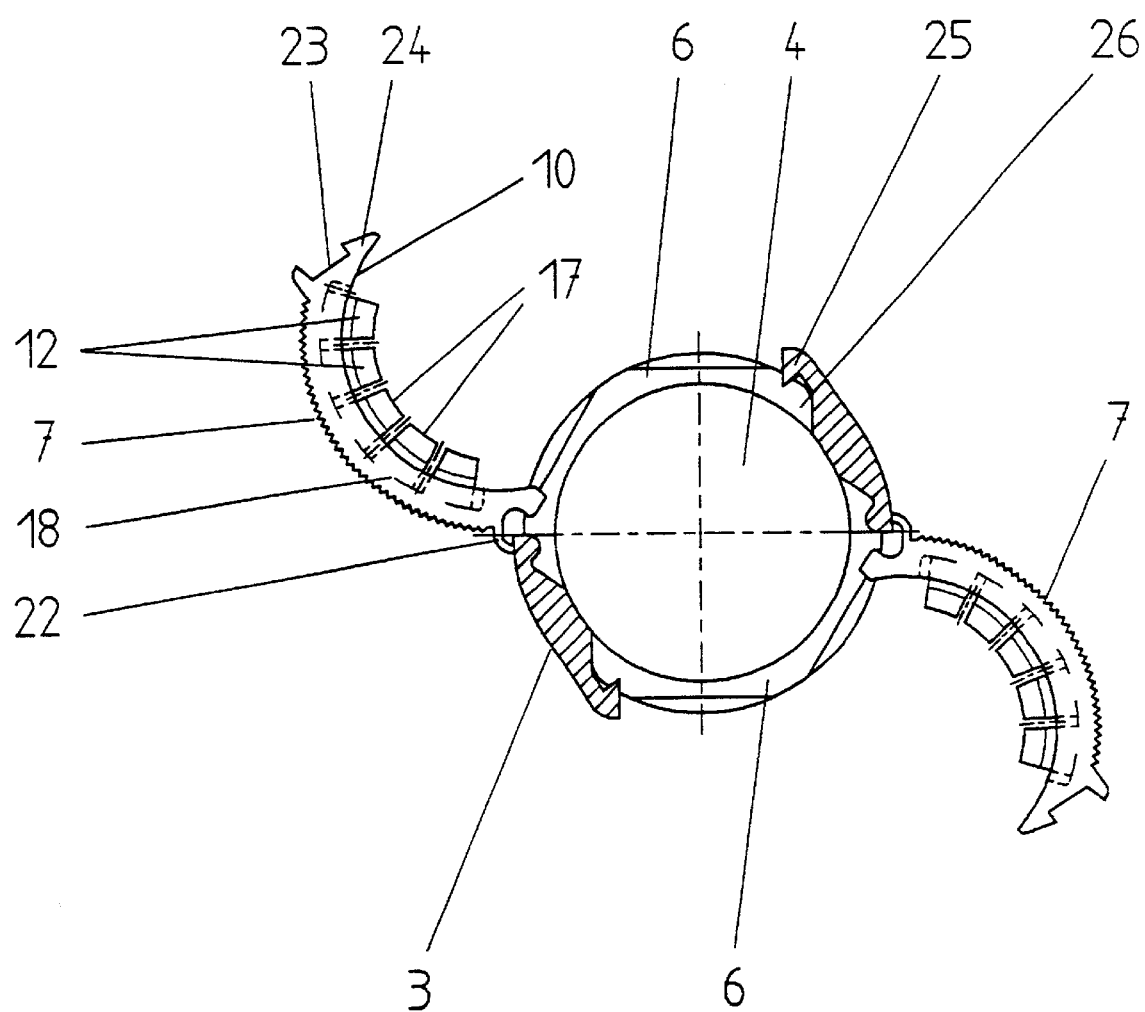
Figure 4:
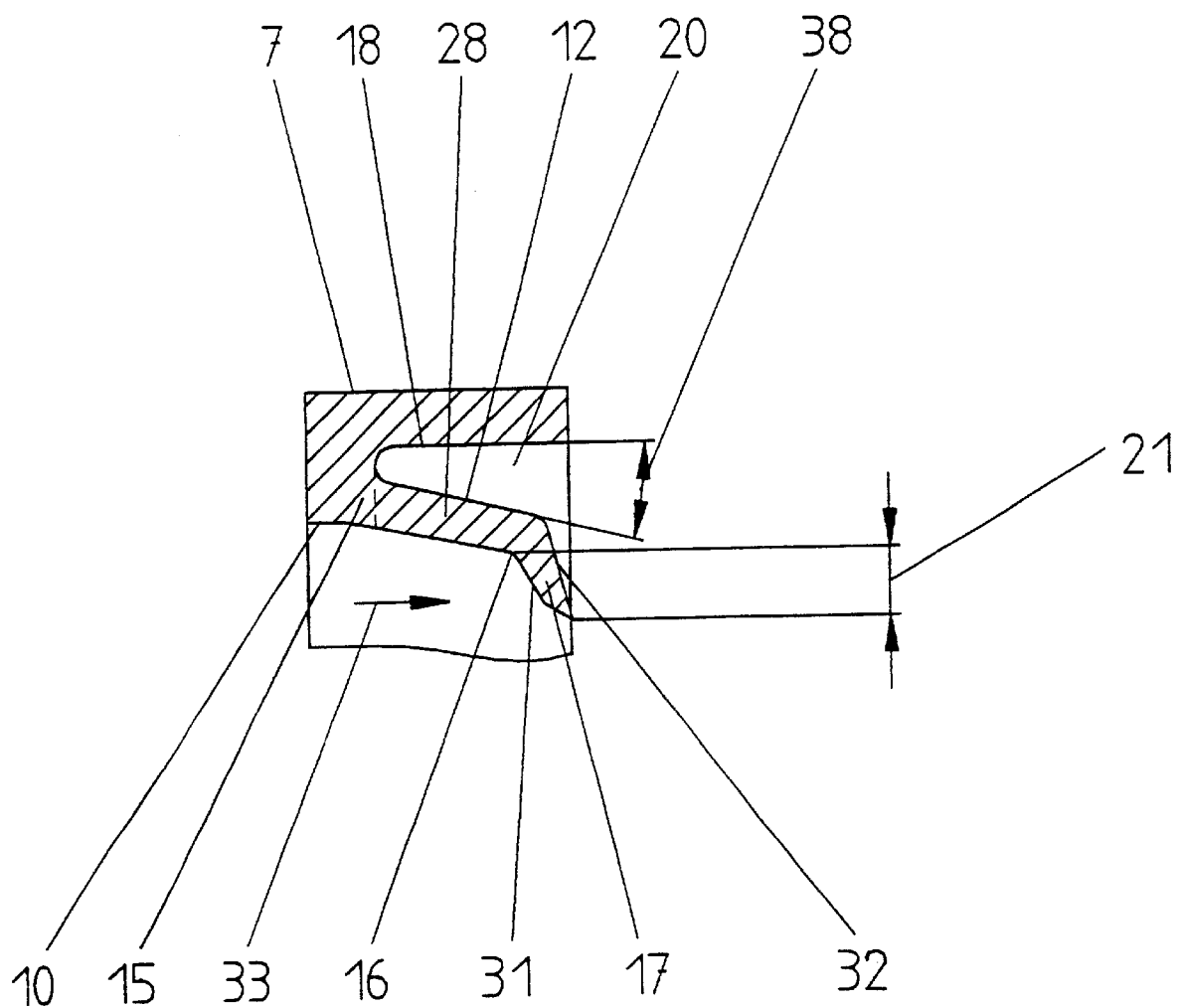

FIG. 2 shows a cross section through the fitting according to FIG. 1 and specifically along line A—A. Via the hinge 22 each pivot wing 7 which forms a locking element, is connected with casing 3. On the free end 23 of the pivot wing 7 is formed a holding element 24 which in the closed state of the pivot wing 7 engages the locking region 26 and cooperates with the locking hook 25. In casing 3 is formed a radial breach 6 to which the locking element or the pivot wing 7 is shifted-in. In the example shown two such breaches 6 are present which oppose one another. On the inside face 10 of the locking element 7 which in the closed state of the pivot wing 7 is directed toward the hollow core space 4 of casing 3, several locking splice-clips 12 are disposed. The implementation of these locking splice-dips 12 is evident in FIG. 4 which represents a cross section through the locking element 7 in the region of a locking splice-clip 12 and is explained with the aid of this FIG. 4. Each of the locking splice-clips 12 is connected on a first end 15 with the inside face 10 of the locking element 7. This first end 15 in the shifted-in state of the pivot wing 7 is directed toward the insertion opening 5 of the casing 3. The second opposing end region 16 of the locking splice-clip 12 is freely movable and directed away from the insertion opening 5 of the hollow core space 4 on casing 3. Consequently, the locking splice-clips 12 extend substantially in the direction of the longitudinal axis 14 of the hollow core space 4. In the example depicted the entire locking element 7 is produced of an elastic synthetic material of stable shape and each locking splice-clip 12 acts as a spring. In order for the spring effect of the locking splice-clips 12 to be utilized an interspace 20 is formed between the free second end region 16 of each locking splice-clip 12 and a groove face 18 on the inside face 10 of the locking element 7. With radial force exertion onto the free end region 16 of the locking splice-clip 12 this end region 16 can be resiliently displaced into the interspace 20 in the radial direction. On the second free end of each locking splice-clip 12 a lock pawl 17 is formed which extends in the radial direction toward the axis 14 of the hollow core space 4. The lock pawl 17 comprises on the side directed toward the insertion opening 5 of the hollow core space 4 an oblique ramp face 31 which extends away from the insertion opening 5. The opposing face adjoining it is implemented as a retaining face 32 and this retaining face 32 extends approximately at right angles to the axis 14 of the hollow core space 4 or has a somewhat lesser slope than the ramp face 31. This lends the lock pawl 17 the form of a claw. If a pipe end is slid in the direction of arrow 33 against the lock pawl 17, the latter is radially deflected due to the oblique ramp face 31. The height 21 of the lock pawl 17 is approximately equal to the interspace 20 behind the locking splice-clip 12 such that the pipe end can be slid through unhindered. As soon as the pipe end is slid in completely, the lock pawl 17 snaps into a corrugation valley on the jacket 9 of the pipe 2 and blocks potential movements counter to the direction of arrow 33. In the non-blocked position, between each locking splice-clip 12 and the groove face 18 an angle 38 between 0° and approximately 30° is formed. The groove face 18 extends parallel to the center axis 14 and the locking splice-clip 12 parallel or converging toward the inside. The shaping of the lock pawl 17 and the parallel or slightly oblique center portion 28 on the lock splice-clip 12 cause the lock pawl 17 under load counter to the direction of arrow 33 to become clawed in the direction of the center axis 14 of the hollow core space 4 and retain a slid-in pipe end 2 in the casing 3. The center portion 28 of the locking splice-clip 12 is therein bent resiliently outwardly into the hollow space 20 and the lock pawl 17 is pressed radially inwardly.

Figure 3:
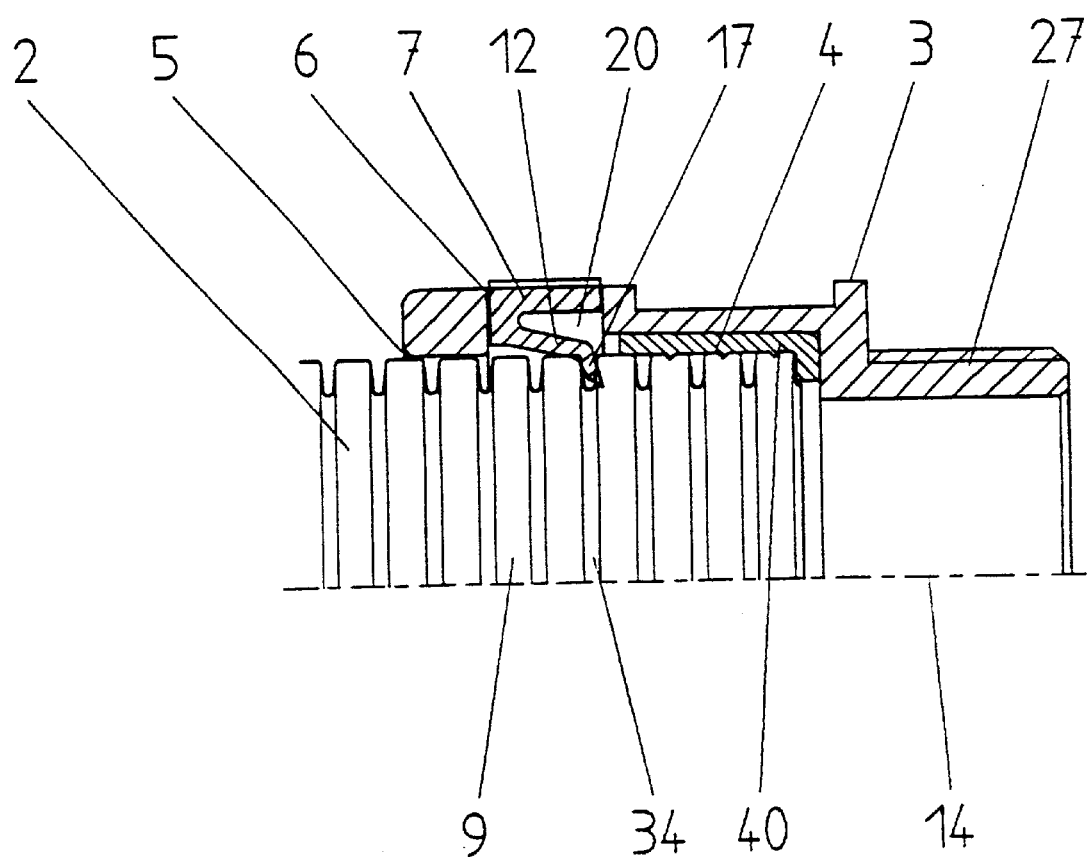

In FIG. 3 is depicted the fitting with the end of a pipe 2 slid into it with the locking wings 7 shifted-in and latched in the locking position. The lock pawl 17 is shifted into a corrugation valley 34 on jacket 9 of pipe 2 and locks this against being pulled out of the casing 3. Potential pull-out forces cause the augmented clawing of the lock pawl 17 into the jacket 9 of the pipe 2 such that pulling out the pipe 2 from the hollow core space 4 of casing 3 becomes impossible. Pulling the pipe 2 out of casing 3 is only possible when the pivot wings 7 are swiveled or shifted radially out of the breach 6 and thus the locking splice-clips 12 and the associated lock pawls 17 are also shifted-out from the jacket 9 of the corrugated pipe 2. At the inner end of the hollow core space 4 is emplaced a seal 40 which seals the jacket 9 of the pipe 2 against the casing 3.

The locking element 7 described in connection with FIGS. 1 to 4 with at least two locking splice-clips 12 can be shifted-in and shifted-out any number of times. When establishing or separating the locking connection between pipe 2 and casing 3 the locking element 7 is not damaged and can therefore be used several times. Yet, the locking connection is highly secure and resists high pull-out forces on pipe 2.

Figure 5:
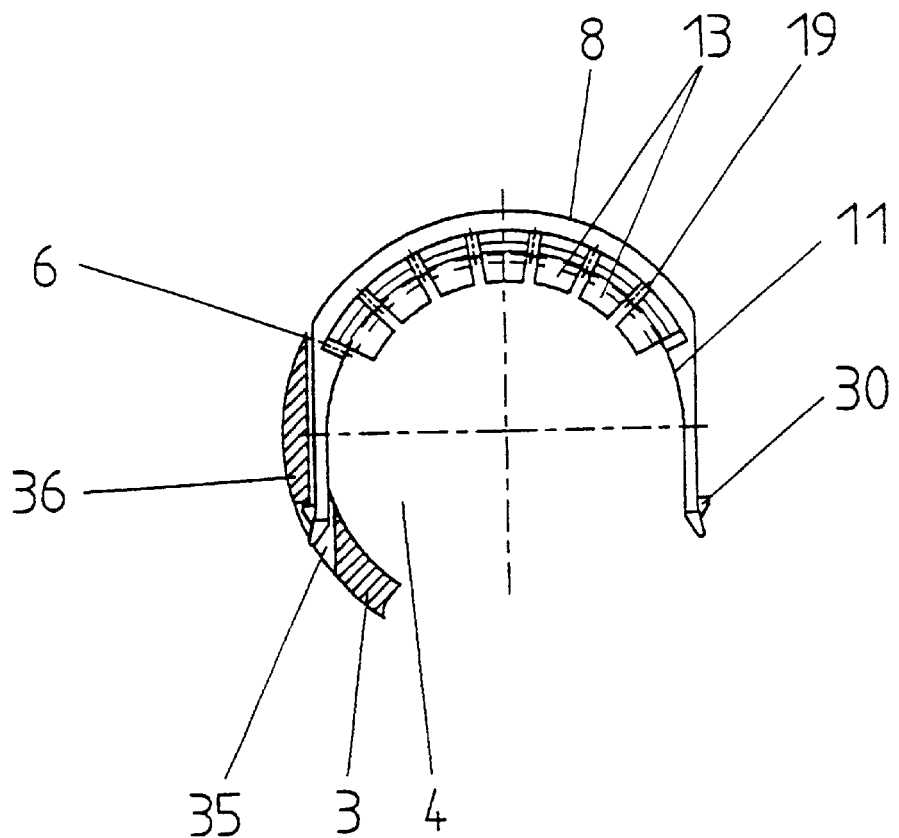

In FIG. 5 is shown a locking element 8 such as is used as supplementary element. In casing 3 of a connecting component 1 on the jacket a radial breach 6 is disposed into which the locking element 8 is slid radially. The locking element 8 is C-shaped and comprises at the free ends holding elements 30 which are inserted into guidances 35 on casing 3 and cooperate with ribs 36. The casing 3 of the connecting component 1 is shown in FIG. 5 only in the left partial region as a partial segment in order to illustrate the connection between the locking element 8 and the casing 3. Further details regarding this type of connection between corrugated pipe 2 and casing 3 with a locking element in the form of a supplementary element 8 correspond to the disposition, known per se, according to DE 29 08 337. In the disposition according to the invention on the locking element 8 locking spliceclips 13 are disposed on the inside face 11 directed in the locking position toward the hollow core space 4 of casing 3.

Figure 6:
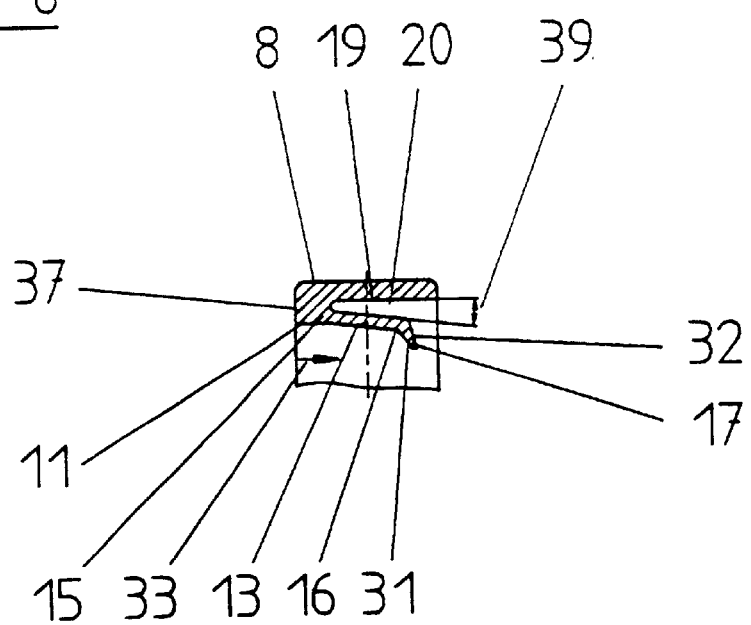

FIG. 6 represents a radial section through the locking element 8 according to FIG. 5 in the region of a locking splice-clip 13. In the shifted-in state of the locking element 8 the end face 37 of the locking element 8 is directed toward the insertion opening 5 of the hollow core space 4 (see FIG. 1). The first end region 15 of the locking splice-clip 13 is connected with the inside face 11 in the region of the end face 37. The second end region 16, directed away from the end face 37, of the locking splice-clip 13 is freely movable and the locking splice-clip 13 is directed approximately in the direction of the longitudinal axis 14 of the hollow core space 4. The locking element 8 in this embodiment example is also fabricated of elastic synthetic material of stable shape and the material is of such strength that it lends the locking splice-clip 13 the function of a spring. On the free end region 16 of the locking splice-clip 13 again a lock pawl 17 is implemented which in the direction of end face 37 has an oblique ramp face 31. The opposing retaining face 32 abutting the ramp face 31 extends approximately radially with respect to the longitudinal axis 14 of the hollow core space 4 or has a somewhat lesser slope than the ramp face 31. On the inside face 11 of the locking element 8 is also implemented in this embodiment example a groove with a groove face 19, and between this groove face 19 and the free end region 16 of the locking splice-clip 13 is a free interspace 20. In this embodiment example the locking splice-clips 13 also form with the groove face 19 an angle 39 between 0° and approximately 30°. The locking splice-clip 13 can be deflected outwardly in the radial direction until it is in contact on the groove face 19 and the lock pawl 17 is virtually immersed in the groove. This deflection of the locking splice-clip 13 takes place by inserting a pipe end in the direction of arrow 33 and over the ramp face 31. When the corrugated pipe 2 is completed inserted in the connecting component 1 and the locking element 8 forming a supplementary element is shifted into the casing 3 and, via the holding elements 30 and the ribs 36, is locked, the lock pawls 17 act upon the locking splice-clips 13 in at least one corrugation valley on the corrugated pipe 2 and block it against being pulled out in the direction of the longitudinal axis 14, or against the direction of arrow 33, from casing 3. Releasing the connection between corrugated pipe 2 and casing 3 is only possible if the locking element 8 is radially shifted out from the breach 6 on casing 3 and the corrugated pipe 2 is released. In this embodiment the locking element 8 with the resilient locking splice-clips 13 is also reusable any number of times since during the establishment and the breaking of the connection between corrugated pipe 2 and casing 3 no damage occurs of the locking elements 8 or locking splice-clips 13. Yet locking elements 8 of the type according to the invention ensure an absolutely secure connection between corrugated pipe 2 and connecting component 1. The effect of the locking splice-clips 13 with the lock pawls 17 is the same as described in FIG. 4. The implementation according to the invention and the disposition of the locking splice-clips 13 with increasing pull-out force on pipe 2 effects an increasing clawing of the lock pawls 17 into the pipe jacket. With the loading removed, unlocking is possible without difficulties and with an auxiliary tool in known manner.

What is claimed is:

1. Joining and connecting component (1) for corrugated pipes (2) comprising at least one hollow core space (4) encompassed by a casing (3), an insertion opening (5) for receiving a pipe end, at least one breach (6) in the casing (3) at least one locking element (7;8) recieved in the breach of the casing which can be shifted-in and shifted-out radially with respect to the casing (3) with parts (17) which engage a jacket (9) of the corrugated pipe (2), wherein at least two locking splice-clips (12;13) are disposed on an inside face (10;11) of the locking element directed toward the jacket (9) of the corrugated pipe (2), and oriented in the direction of the longitudinal axis (14) of the hollow core space (4), a first end region (15) of these locking splice-clips (12;13) is connected with the inside face (10;11) of the locking element (7;8) and the second end region (16) is directed away from the insertion opening (5) for the corrugated pipe (2) of the hollow core space (4) and is freely movable, at least one partial region of each locking splice-clip (12;13) is implemented so as to be elastic and as a spring and on the free end region (16) of each locking splice-clip (12;13) a lock pawl (17) is implemented and this lock pawl (17) is directed toward the longitudinal axis (14) of the hollow core space (4), the at least one locking element (7;8) being movable radial with respect to the casing for unlocking the lock pawl (17) of all the splice-clips to release a corrugated pipe from the joining and connecting component.

2. Joining and connecting component as claimed in claim 1, wherein the lock pawl (17) is directed approximately radially with respect to the longitudinal axis (14) of the hollow core space (4).

3. Joining and connecting component as claimed in claim 1, wherein the locking element is a pivot wing (7), that this connected unilaterally via a hinge (22) with the casing (3) and a holding element (24) disposed opposite the hinge which, after the locking element (7) is in the shifted-in position, engages a locking hook (25) on the casing (3).

4. Joining and connecting component as claimed in claim 1, wherein the locking element is a supplementary element (8) independent of the casing (3), that this supplementary element (8) can be inserted radially into the breach (6) of the casing (3), that on the supplementary element (8) holding elements (30) are disposed and that these holding elements (30) in the shifted-in position of the locking element (8) engage holding ribs (36) on the casing (3).

5. Joining and connecting component as claimed in claim 1, wherein the lock pawl (17) of the locking splice-clips (12;13) comprises on the side, directed toward the insertion opening (5) of the hollow core space (4), an oblique ramp face (31) extending away from the insertion opening (5) of the hollow core space (4) and the opposing retaining face (32) extends at approximately right angles to the axis (14) of the hollow core space (4) or at a somewhat lesser slope than the ramp face (31).

6. Joining and connecting component as claimed in claim 1, wherein, in an unshifted state of the locking elements (7;8) between the locking splice-clips (12;13) and the groove faces (18;19) an angle (38;39) is formed of maximally 30°.

7. Joining and connecting component as claimed in claim 1, wherein each locking splice-clip (12;13) has a groove defining an interspace (20), each lock pawl (17) having a radial height (21), the interspace being at least equal in radial size to the radial height of the lock pawl.

* * * * *